UNITED STATES PATENT OFFICE.

ARVID W. EKSTROM, OF LOS ANGELES, CALIFORNIA.

PROCESS OF MANUFACTURING ALKALI HYDROXIDS.

1,034,599.  Specification of Letters Patent.  Patented Aug. 6, 1912.

No Drawing.  Application filed April 17, 1911. Serial No. 621,504.

*To all whom it may concern:*

Be it known that I, ARVID W. EKSTROM, a citizen of Sweden, residing at Los Angeles, in the county of Los Angeles and State of California, have invented new and useful Improvements in Processes of Manufacturing Alkali Hydroxids, of which the following is a specification.

This invention relates to a process for producing alkali hydroxids from the native alkali salts by purely chemical action, and it is the chief object of the invention, to accomplish the production of alkali hydroxids by treating the alkali salts by means of barium oxid or hydroxid and hydrofluosilicic acid.

In order to illustrate the manner of carrying out the process the method, as applied to the manufacturing of sodium hydroxid (NaOH) from native sodium salts such as chlorids has been given as an example. The steps of the process will now be set forth in order:

*A. Preparation of sodium fluosilicate.—* An aqueous solution of sodium chlorid (NaCl) is treated in a suitable vessel with hydrofluosilicic acid whereby sodium fluosilicate, ($Na_2SiF_6$) is precipitated leaving the hydrochloric acid in solution. The reaction that takes place is as follows:

$$2NaCl + H_2SiF_6 = \underset{\text{(Precipitate)}}{Na_2SiF_6} + \underset{\text{(Solution)}}{2HCl}.$$

The liquid obtained from the precipitate in this reaction, namely hydrochloric acid can be easily separated from the precipitate by decantation and can be concentrated and applied to any of the common uses of this chemical.

*B. Treatment of sodium fluosilicate with barium hydroxid.—*The precipitate of sodium fluosilicate is treated by boiling in a suitable vessel with an aqueous solution of barium hydroxid whereby a double decomposition takes place, yielding sodium hydroxid and a precipitate of barium fluosilicate, in accordance with the following chemical equation:—

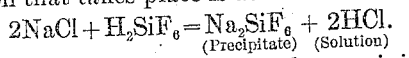
$$Na_2SiF_6 + Ba(OH)_2 = \underset{\text{(Solution)}}{2NaOH} + \underset{\text{(Precipitate)}}{BaSiF_6}$$

The sodium hydroxid or caustic soda thus obtained in solution may be readily decanted from the precipitate and can then be conveyed into any suitable evaporator for concentration.

*C. Recovery of hydrofluosilicic acid.—* The precipitate of barium fluosilicate is treated by slightly heating in a suitable iron vessel with diluted sulfuric acid ($H_2SO_4$) whereby the barium fluosilicate is decomposed forming hydrofluosilicic acid ($H_2SiF_6$) which goes into solution, and an insoluble precipitate of barium sulfate ($BaSO_4$). The reaction that takes place is as follows:

$$H_2SO_4 + BaSiF_6 = \underset{\text{(Solution)}}{H_2SiF_6} + \underset{\text{(Precipitate)}}{BaSO_4}$$

The aqueous solution of hydrofluosilicic acid, thus obtained, is separated from the precipitate by decantation and may then be used again in carrying out the step of the process described under A. In this manner the said hydrofluosilicic acid is saved and may be used over and over again with very little loss. The barium sulfate ($BaSO_4$) thus obtained as a precipitate may be converted into barium hydroxid ($Ba(OH)_2$), by treating the same with oil as a reducing agent in the presence of heat as described in my application, S. N. 642,279, filed August 7, 1911 for a patent for a process of manufacturing barium and strontium compounds. By this process barium sulfid (BaS) is formed which is to be treated with carbonic acid (CO2) converting it into barium carbonate ($BaCO_3$) and this barium carbonate is converted into barium oxid (BaO) by the use of oil as a reducing agent in the presence of heat, as set forth in my component application. The barium oxid thus obtained is hydrated with water converting it into barium hydroxid or ($Ba(OH)_2$) the latter substance being useful again in stage B of the above described process.

What I claim is:—

The process of making alkali hydroxid comprising the treating of an alkali fluosilicate with barium hydroxid whereby alkali hydroxid and barium fluosilicate are formed.

In witness that I claim the foregoing I have hereunto subscribed my name this 11th day of April, 1911.

ARVID W. EKSTROM.

Witnesses:
 EDMUND A. STRAUSE,
 EARLE R. POLLARD.